United States Patent
Lauridsen et al.

(10) Patent No.: US 12,225,501 B1
(45) Date of Patent: Feb. 11, 2025

(54) PAGING INFORMATION AND PAGING-RELATED ACTIONS

(71) Applicant: Nokia Technologies Oy, Espoo (FI)

(72) Inventors: Mads Lauridsen, Gistrup (DK); Ahlem Khlass, Massy (FR); Daniela Laselva, Klarup (DK); Jussi-Pekka Koskinen, Oulu (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/828,204

(22) Filed: Sep. 9, 2024

(51) Int. Cl.
H04W 68/00 (2009.01)
(52) U.S. Cl.
CPC .................................. H04W 68/005 (2013.01)
(58) Field of Classification Search
CPC ... H04W 68/005; H04W 68/12; H04W 68/02; H04W 88/06; H04W 36/14; H04W 36/144
USPC ...................................... 455/426.1, 458, 515
See application file for complete search history.

(56) References Cited

U.S. PATENT DOCUMENTS

| | | | | |
|---|---|---|---|---|
| 2019/0239051 A1* | 8/2019 | Hwang | .................. | H04W 76/27 |
| 2020/0092875 A1* | 3/2020 | Takeda | .............. | H04W 74/0833 |
| 2023/0199902 A1* | 6/2023 | Vogedes | ................ | H04W 68/00 |
| | | | | 455/458 |
| 2024/0155472 A1* | 5/2024 | Abedini | ................ | H04W 48/20 |
| 2024/0340348 A1* | 10/2024 | Lei | ........................ | H04L 5/0007 |

FOREIGN PATENT DOCUMENTS

CN 116250306 A 6/2023

OTHER PUBLICATIONS

Fujitsu. "R2-2210105 Consideration on network energy saving" 3GPP TSG-RAN WG2 Meeting #119bis electronic, Oct. 19, 2022 (Oct. 19, 2022), section 2.
Nokia et al. "R2-2211966 Common Channel Updates for NES" 3GPP TSG-RAN WG2 Meeting #120, Nov. 18, 2022 (Nov. 18, 2022), the whole document.

(Continued)

*Primary Examiner* — Michael Y Mapa
(74) *Attorney, Agent, or Firm* — Robert P. Michal, Esq.; Carter, DeLuca & Farrell LLP

(57) ABSTRACT

Example embodiments relate to devices, methods, apparatuses and computer readable mediums for paging information and paging-related actions. A terminal device may receive via a first cell first paging information related to a second cell or another carrier of the first cell, and to perform a paging-related action via the second cell or said another carrier based on the first paging information. Synchronization signals are not transmitted in the second cell or said another carrier. The paging-related action may include monitoring for second paging information in the second cell or said another carrier if the first paging information includes a paging early indication, a wake-up signal, or a scheduling message for scheduling a paging message, or performing at least one action for transferring information via the second cell or said another carrier if the first paging information includes a paging message or a wake-up signal.

1 Claim, 5 Drawing Sheets

(56) References Cited

OTHER PUBLICATIONS

International Search Report issued by the China National Intellecutal Property Adminstration acting as the International Searching Authority in relation to International Application No. PCT/CN2023/118025 dated Jun. 5, 2024 (4 pages).

Written Opinion of the International Searching Authority issued by the China National Intellecutal Property Adminstration acting as the International Searching Authority in relation to International Application No. PCT/CN2023/118025 dated Jun. 5, 2024 (3 pages).

* cited by examiner

400

PAGING INFORMATION AND PAGING-RELATED ACTIONS

CROSS-REFERENCE TO RELATED APPLICATIONS

This application claims priority to Chinese Patent Application No. PCT/CN2023/118025, filed Sep. 11, 2023, the disclosure of this application is expressly incorporated herein by reference in its entirety.

TECHNICAL FIELD

Various example embodiments described herein generally relate to communication technologies, and more particularly, to devices, methods, apparatuses and computer readable mediums for paging information and paging-related actions.

BACKGROUND

Certain abbreviations that may be found in the description and/or in the figures are herewith defined as follows:
DCI Downlink Control Information
MT Mobile Terminated
NES Network Energy Saving
PDCCH Physical Downlink Control Channel
PDSCH Physical Downlink Shared Channel
PEI Paging Early Indication
PO Paging Occasion
RA Random Access
RAT Radio Access Technology
RRC Radio Resource Control
SDT Small Data Transmission
SIB1 System Information Block type 1
SSB Synchronization Signal Block
TRS Tracking Reference Signal
UE User Equipment
WUS Wake-Up Signal 5G New Radio (NR) is designed to enable denser network deployments for higher capacity and performance, which implies a huge increase in energy consumption that adds up to a significant part of operator's expenses, and also leads to environment impacts. Network energy saving (NES) is becoming one of the top priorities of the telecom industry. NR supports radio resource control (RRC) idle and inactive states of user equipments (UEs) for power saving. The RRC idle and inactive UEs are required to monitor paging occasions in case the network has signalings or data for the UEs.

SUMMARY

A brief summary of exemplary embodiments is provided below to provide basic understanding of some aspects of various embodiments. It should be noted that this summary is not intended to identify key features of essential elements or define scopes of the embodiments, and its purpose is to introduce some concepts in a simplified form as a preamble for a more detailed description provided below.

In a first aspect, an example embodiment of a terminal device is provided. The terminal device may comprise at least one processor and at least one memory. The at least one memory stores instructions which, when executed by the at least one processor, cause the terminal device at least to receive, via a first cell, first paging information related to a second cell or another carrier of the first cell, and to perform a paging-related action via the second cell or said another carrier based on the first paging information. The second cell or said another carrier may be configured such that synchronization signals are not transmitted via the second cell or said another carrier. The paging-related action may comprise monitoring for second paging information in the second cell or said another carrier in a case where the first paging information comprises a paging early indication, a wake-up signal, or a scheduling message for scheduling a paging message, or performing at least one action for transferring information via the second cell or said another carrier in a case where the first paging information comprises a paging message or a wake-up signal.

In a second aspect, an example embodiment of a network device is provided. The network device may comprise at least one processor and at least one memory. The at least one memory stores instructions which, when executed by the at least one processor, cause the network device at least to determine to page a terminal device camping on a first cell, and to transmit, via the first cell, first paging information redirecting the terminal device to a second cell or another carrier of the first cell. The second cell or said another carrier may be configured such that synchronization signals are not transmitted via the second cell or said another carrier.

Example embodiments of methods, apparatuses and computer readable mediums are also provided. Such example embodiments generally correspond to the above example embodiments of the terminal device and the network device, and a repetitive description thereof is omitted here for convenience.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

As used herein, the term "network device" refers to any suitable entities or devices that can provide cells or coverage, through which terminal devices can access the network or receive services. The network device may be commonly referred to as a base station. The term "base station" used herein can represent a node B (NodeB or NB), an evolved node B (eNodeB or eNB), or a gNB or an ng-eNB. The base station may be embodied as a macro base station, a relay node, or a low power node such as a pico base station or a femto base station. The base station may consist of several distributed network units, such as a central unit (CU), one or more distributed units (DUs), one or more remote radio heads (RRHs) or remote radio units (RRUs). The number and functions of these distributed units depend on the selected split RAN architecture.

As used herein, the term "terminal device" or "user equipment" (UE) refers to any entities or devices that can wirelessly communicate with the network device or with each other. Examples of the terminal device can include a mobile phone, a mobile terminal, a mobile station, a subscriber station, a portable subscriber station, an access terminal, a computer, a wearable device, an on-vehicle communication device, a machine type communication (MTC) device, an internet of things (IoT) device, an internet of everything (IoE) device, a device-to-device (D2D) communication device, a vehicle to everything (V2X) communication device, a sensor and the like. The term "terminal device" can be used interchangeably with UE, a user terminal, a mobile terminal, a mobile station, or a wireless device.

Figure 1:
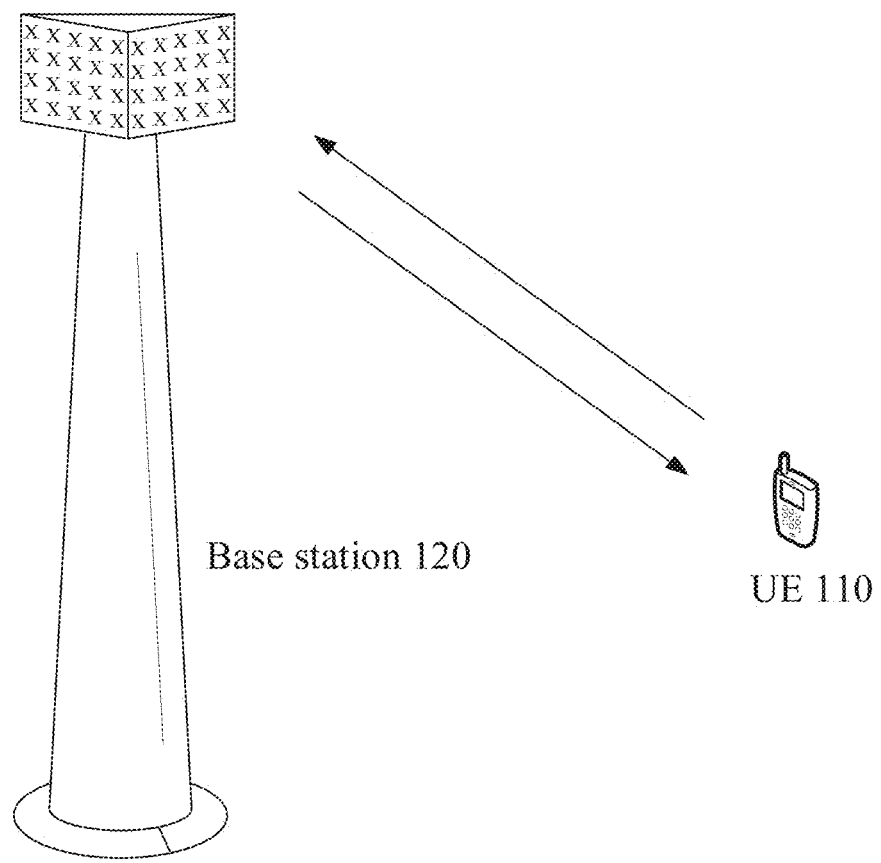
FIG. 1 is a schematic diagram illustrating a mobile communication network in which example embodiments of the present disclosure can be implemented.

FIG. 1 is a schematic diagram illustrating a mobile communication network 100 in which example embodiments of the present disclosure can be implemented. The mobile communication network 100 (or cellular communication network), which may be a part of a larger network or system, may include one or more base stations (BSs) 120 that form a radio access network (RAN) to provide access to network for one or more user equipments (UEs) 110. The base stations 120 may be connected to and controlled by a core network (not shown). FIG. 1 shows one base station 120 and one UE 110 as an example. The base station 120 can support more than one cell (not shown), and the UE 110 may camp in a cell and establish a radio resource control (RRC) connection with the base station 120 to receive data on a downlink (DL) channel transmitted from the base station 120 or transmit data on an uplink (UL) channel to the base station 120. When the UE 110 has no UL data to transmit and no DL data to receive, it may transition from the RRC connected state to an idle or inactive state for power saving.

As 5G New Radio (NR) base stations may have higher power consumption than 4G Long Term Evolution (LTE) base stations and may be deployed in higher density, the overall power consumption of 5G networks may be multiple times of 4G networks. Network energy saving (NES) has become a top priority for the mobile communication network 100. One solution for network energy saving is to omit synchronization signal blocks (SSBs) and system information block type 1 (SIB1) transmissions in a cell, and the UE 110 can acquire synchronization with the SSB/SIB1-less cell from another serving cell that transmits SSBs and SIB1. Currently, the SSB/SIB1-less operation is supported for a secondary cell (SCell) in an intra-band carrier aggregation (CA) scenario, and it is expected to extend the SSB/SIB1-less operation to an inter-band CA scenario in Release 18, where the UE measures SSBs transmitted on a primary cell (PCell) or another SCell to acquire time and frequency synchronization with the SSB/SIB1-less SCell. However, the SSB/SIB1-less operation can serve only UEs in the RRC connected state.

It would be beneficial to extend the SSB/SIB1-less operation to non-CA cases so as to serve at least partially UEs in the RRC idle or inactive state, enabling for example synchronization and paging procedures. Considering a scenario where collocated coverage and capacity cells are deployed at a given base station, e.g. the base station 120, the capacity cell may be deactivated for energy saving purposes whenever the load in the system is low. The deactivated capacity cell will not transmit SSBs (and SIB1) and cannot offer any service to any UE. The RRC idle and inactive UEs would then camp on the coverage cell and connect to the coverage cell when needed, because they are not aware of the presence of the deactivated capacity cell. However, it may pose a load/capacity challenge to the coverage cell when the load starts to increase again and the capacity cell is not yet reactivated. The time to power on a sleeping cell that is deactivated can be tens of milliseconds or longer and therefore it is not always possible to immediately offload UEs to the capacity cell. If the capacity cell was reactivated too early, it would decrease energy saving gains.

Example embodiments of the present disclosure propose a mechanism for SSB/SIB1-less operations in non-CA cases, enabling use of an SSB/SIB1-less cell for RRC idle and inactive UEs. In an example embodiment, the network can dynamically redirect UEs, which are expected to be paged, to an SSB/SIB1-less cell by sending paging information to the UEs via an anchor cell collocated with the SSB/SIB1-less cell. It avoids long latency for paging and access to the SSB/SIB1-less cell, without compromising the network energy saving gains because it does not need to reactivate the sleeping SSB/SIB1-less cell too early. The UEs can acquire synchronization and system information of the SSB/SIB1-less cell from the anchor cell where they are camping, regardless of UE states or whether the UEs are operating in the CA mode. Then the UEs can perform paging-related actions/procedures in the SSB/SIB1-less cell. As such, the SSB/SIB1-less cell can serve at least partially RRC idle and inactive UEs. The proposed mechanism can also be applied to enable the SSB/SIB1-less operations for one or more carriers within a single cell which operates multiple carriers. For example, the network can dynamically redirect UEs to an SSB/SIB1-less carrier by sending paging information to the UEs via another carrier on which SSBs and SIB1 are transmitted.

Figure 2:
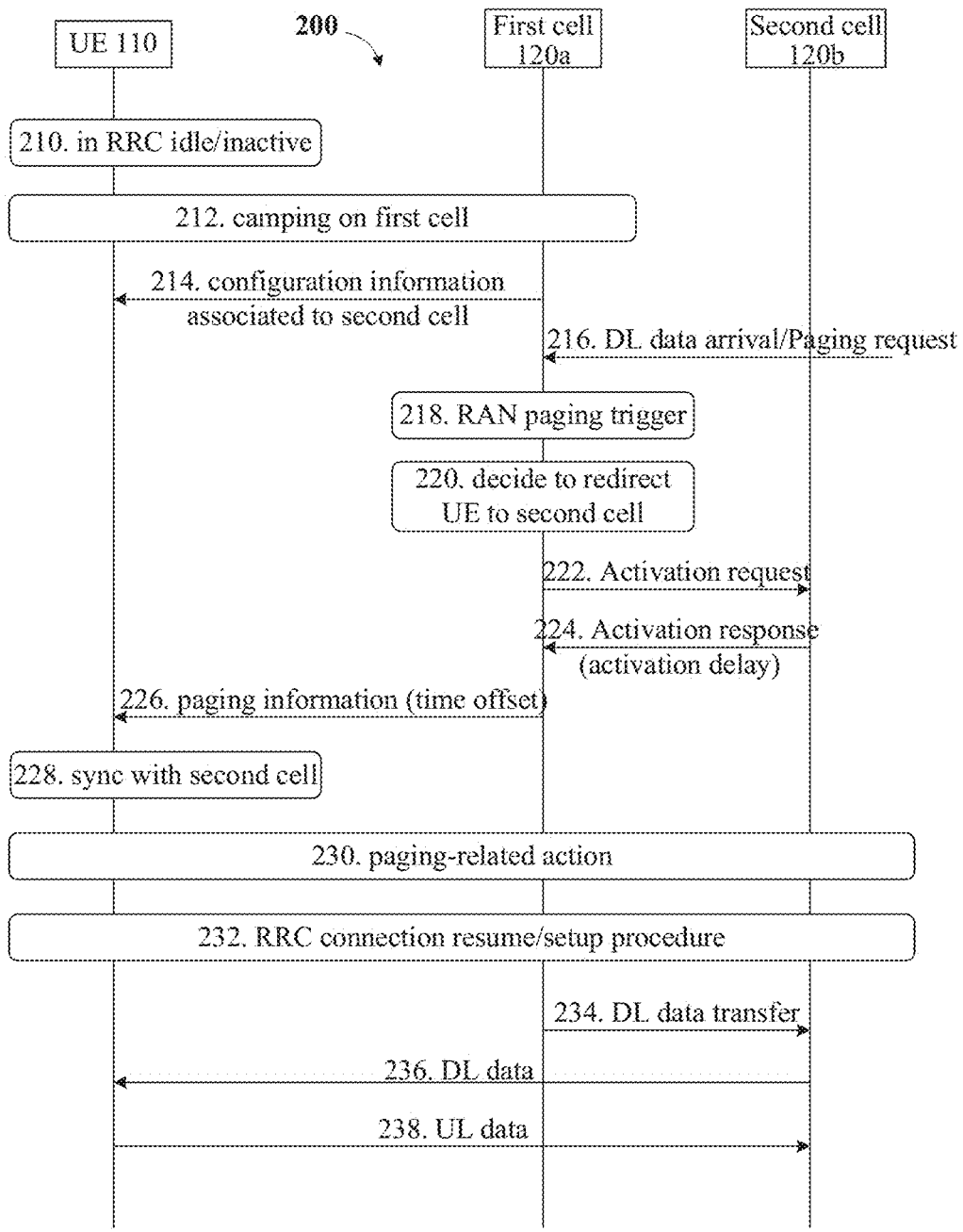
FIG. 2 is a message flow chart illustrating a process according to an example embodiment of the present disclosure.

FIG. 2 is a message flow chart illustrating a process 200 for the SSB/SIB1-less cell operation according to an example embodiment of the present disclosure. The process 200 may be performed at the UE 110, a first cell 120a, and a second cell 120b collocated with the first cell 120a. The first cell 120a and the second cell 120b may be supported by the single base station 120, or by different base stations 120. It would be appreciated that operations discussed below relating to a cell (e.g. performed by a cell or at cell) are performed by a base station, network node, or components of a base station or network node supporting the cell. Similarly, operations discussed below relating to a carrier (e.g. performed by a carrier or at carrier) are performed by a base station or network node, or components of a base station or network node supporting the cell. In the description at least some of the actions are described as if they are performed by/at a cell or by/at carrier for simplicity reasons as one or more network nodes or base stations may be used to provide the two different cells and/or two different carriers. It is further noted that the solution may be applicable to cases in which more than two carriers or cells are used; e.g. such that SSB/SIB is transmitted for one cell, but not for two or more cells.

Referring to FIG. 2, the UE 110 may enter into or be in (e.g. has entered before) an RRC idle or inactive state at 210. Being in RRC idle state or RRC inactive state means that the UE 110 is not operating in a carrier aggregation (CA) or dual connectivity (DC) mode. In other words, if the first cell 120*a* and the second cell 120*b* are supported by the single base station 120, they are not aggregated for CA operations of the UE 110. If the first cell 120*a* and the second cell 120*b* are supported by different base stations 120, they are not included in a master cell group (MCG) and a secondary cell group (SCG) for DC operations of the UE 110. The UE 110 may enter into the RRC idle or inactive state for energy saving or others reasons. Here the RRC idle/inactive UE is described as an example, but it would be appreciated that the principle of the process 200 is also applicable to RRC connected UEs that have an RRC connection with the first cell 120*a*.

At 212, the UE 110 may camp on the first cell 120*a*. While camping on the first cell 120*a*, the UE 110 can receive SSBs and system information broadcast e.g. SIB1 from the first cell 120*a*. If needed, the UE 110 may initiate a random access procedure using the received system information to establish an RRC connection with the first cell 120*a*. The second cell 120*b*, which is collocated with the first cell 120*a*, may be deactivated and the UE 110 is not aware of the presence of the second cell 120*b*. The first cell 120*a* may also be referred to as a coverage cell or an anchor cell, while the second cell 120*b* may also be referred to as a capacity cell or a non-anchor cell. In an example embodiment, the first cell 120*a* and the second cell 120*b* are not configured for dual connectivity. In an example embodiment, the first cell 120*a* may be a cell of a first radio access technology (RAT), and the second cell may be a cell of a second RAT that is different than the first RAT. For example, the first cell 120*a* may be a 4G LTE cell, while the second cell 120*b* may be a 5G NR cell. In an example embodiment, the first cell 120*a* and the second cell 120*b* share the same carrier. In another example embodiment, the first cell 120*a* and the second cell 120*b* operate with different carriers. For example, the first cell 120*a* and the second cell 120*b* may operate on different carrier frequencies.

At 214, the UE 110 may receive configuration information associated with the second cell 120*b* from the first cell 120*a*. The configuration information may indicate that the second cell 120*b* is an SSB/SIB1-less cell, i.e. it does not transmit SSBs or broadcast system information e.g. SIB1. The configuration information may also include information for acquiring time and frequency synchronization with the second cell 120*b*. For example, the configuration information may include one or more of:

- information of time and frequency resources and configuration of the second cell 120*b*;
- information of a reference signal of the first cell 120*a* that can be used to acquire time and frequency synchronization with the second cell 120*b*;
- information of timing advance (TA) for the second cell 120*b* where the first cell 120*a* may be used as a timing reference; or
- information indicating conditional availability of a tracking reference signal (TRS) or other reference signals (RSs) on the second cell 120*b* that is configured to be collocated with occasions of paging-related actions, e.g. collocated with paging occasions or near random access channel (RACH) occasions, to facilitate UE synchronization with the second cell 120*b*.

In an example embodiment, the configuration information may also indicate to the UE 110 a paging-related action to be performed in the second cell 120*b*. For example, the paging-related action may include monitoring paging-related information transmitted from the second cell 120*b*, such as a wake-up signal (WUS), a paging early indication (PEI), a scheduling message e.g. downlink control information (DCI) for scheduling a paging message, or a paging message. In an example, the configuration information may further indicate whether a legacy paging message or a paging message with mobile terminated small data transmission (MT-SDT) is supported at the second cell 120*b*. Alternatively or additionally, the paging-related action may include performing at least one action for transferring information via the second cell 120*b*, such as a transmission on a data channel in preconfigured resources, an action for a random access procedure, an action for an RRC setup procedure, or an action for an RRC resume procedure.

Optionally, the configuration information may also indicate when the UE 110 is allowed to perform the paging-related action, e.g. after expiry of a timer, an offset after the UE 110 receives paging information, or in indicated time and frequency resources. For example, the configuration information may optionally include at least one of:

- paging configuration information indicating paging occasions such as time and/or frequency information;
- random access resource information such as random access preamble, time and/or frequency information, random access occasions; or
- information on how long time the UE 110 shall perform the paging-related action on the second cell 120*b*, e.g. time in milliseconds, seconds, minutes, and/or hours.

In case there are multiple SSB/SIB1-less cells available, the configuration information may further indicate a cell identity (e.g. physical cell identity, PCI) of the SSB/SIB1-less cell (i.e., the second cell 120*b*) where the UE 110 shall perform the paging-related action. The configuration information may also indicate carrier frequency used in the indicated SSB/SIB1-less cell.

The above mentioned configuration information may be transmitted via RRC signaling and/or system information broadcasting e.g. SIB type 1 or other types. In case of via system information broadcasting, the first cell 120*a* may transmit the system information associated with the second cell 120*b* separately from the system information associated with the first cell 120*a*. In an example embodiment, at least a part of the configuration information may be transmitted in paging information transmitted to the UE 110 as discussed below, or preconfigured at the UE 110.

With continued reference to FIG. 2, at 216, the first cell 120*a* may receive a paging request or downlink (DL) data for the UE 110 from a core network node (not shown). For example, if the UE 110 is in the RRC idle state and it has an incoming call or a short message, an access and mobility management function (AMF) in the core network may transmit a paging request to the first cell 120*a*. If the UE 110 is in the RRC inactive state, the core network still maintains context of the UE 110, and a user plane function (UPF) in the core network may forward the DL data for the UE 110 to the first cell 120*a*. Based on the received paging request or DL data for the UE 110, the first cell 120*a* may determine to page the UE 110 at 218.

At 220, the first cell 120*a* may decide to redirect the UE 110 to the second cell 120*b*, i.e. the SSB/SIB1-less cell. In an example embodiment, the first cell 120*a* may decide to redirect the UE 110 to the second cell 120*b* based on one or more of the following conditions:

the type of DL traffic for which the UE 110 is to be paged;
the actual load of the first cell 120*a*; or
the sleeping state of the second cell 120*b*, i.e. the transition time for the second cell 120*b* to transition from the sleeping state to the active state.

For example, if the DL traffic is of a special type that is supported on the second cell 120*b*, or the current load of the first cell 120*a* is too high to accommodate the UE 110, the first cell 120*a* may decide to redirect the UE 110 to the second cell 120*b*. If the DL traffic includes urgent data while the second cell 120*b* would take a relatively long time to transition from the sleeping mode to the active mode, the first cell 120*a* may decide not to redirect the UE 110 to the second cell 120*b*.

In case the first cell 120*a* decides to redirect the UE 110 to the second cell 120*b*, the first cell 120*a* may transmit an activation request to the second cell 120*b* at 222 to activate or reactivate the second cell 120*b*. The activation request may include cause for activation, e.g., for paging UE, DL data transfer to UE, or load balance. If the second cell 120*b* can be activated, it may respond to the activation request by sending an activation response to the first cell 120*a* at 224. The activation response may indicate that the second cell 120*b* can be activated or has been activated. In an example embodiment, the activation response may indicate an activation delay after which the second cell 120*b* would finish the activation procedure and enter into the active state. If the second cell 120*b* cannot be activated for a certain reason, it may send an activation rejection message to the first cell 120*a* at 224, or it may not respond to the first cell 120*a*. In case the first cell 120*a* and the second cell 120*b* are supported by different base stations, the activation request, activation response and activation reject messages may be transmitted via Xn signaling (or some other interface arranged between base stations or network nodes) between the different base stations. If the first cell 120*a* and the second cell 120*b* are supported by a single base station, the activation request, activation response and activation reject messages may be transmitted via internal signaling within the base station. If the second cell 120*b* is already in the active state, the operations 222, 224 may be omitted.

After receiving the activation response from the second cell 120*b*, the first cell 120*a* may transmit paging information (also referred to as "first paging information") related to the second cell 120*b* to the UE 110 at 226, to redirect the UE 110 to the second cell 120*b*. In an example embodiment, the first paging information may comprise a paging early indication (PEI), a scheduling message for scheduling a paging message, a paging message, or any sort of wake-up signals (WUSs) that indicate needs for monitoring for paging. It would be appreciated that the first paging information may comprise more than one of the above-mentioned messages. For example, the first cell 120*a* may transmit the PEI first, followed by the scheduling message to schedule a paging message, and then the paging message to the UE 110. In another example, the first cell 120*a* may transmit the WUS first to wake up the UE 110, and then transmit the PEI or the scheduling message.

In an example embodiment, the paging message may include paging records indicating which UEs shall be redirected to the second cell 120*b*, i.e. shall perform paging-related actions in the second cell 120*b*. The paging message may further indicate an identity, e.g. physical cell identity (PCI), of the second cell 120*b* and/or carrier frequency of the second cell 120*b*. The PCI and carrier frequency may be included in information elements (IEs) common to all paged UEs. In another example embodiment, the paging message may be a legacy paging message, and the UE 110 can obtain information of the PCI and carrier frequency of the second cell 120*b* from for example the configuration information associated to the second cell 120*b* received at 214. As discussed above, the configuration information may indicate whether the UE 110 shall perform the paging-related actions on the first cell 120*a* or on the second cell 120*b*.

The scheduling message for scheduling a paging message may comprise downlink control information (DCI) transmitted on a physical downlink control channel (PDCCH), which is also referred to as paging DCI. The paging information may be included in a short message of the paging DCI. For example, the short message may include a paging indication bit(s) indicating whether the paged UEs shall perform the paging-related actions on the second cell 120*b*. In an example, the paging indication may include bits indicating the PCI and/or carrier frequency of the second cell 120*b*.

The paging early indication (PEI) may be transmitted in DCI on PDCCH, indicating to the paged UE whether to decode paging occasions. It can improve power saving in idle and inactive UEs. The PEI may also include a paging indication indicating the PCI and/or carrier frequency of the second cell 120*b* where the paged UEs shall perform the paging-related action. In an example embodiment, the PEI may include subgroup configuration information to redirect a subgroup of UEs monitoring the PEI to the second cell 120*b* or another carrier. Likewise the WUS may also utilize UE grouping information to redirect a group of UEs to the second cell 120*b* or another carrier.

In an example embodiment, the paging information transmitted to the UE 110 may further indicate a time offset for the UE 110 to perform the paging-related action. The UE 110 may perform the paging-related action on the second cell 120*b* at least the time offset after receiving the paging information. The first cell 120*a* may determine the time offset based on the activation delay received in the activation response from the second cell 120*b* to ensures that the second cell 120*b* has been activated when the UE 110 performs the paging-related action on the second cell 120*b*. The paging information may explicitly indicate a value of the time offset, or implicitly indicate the time offset by mapping it to other parameters or information included in the paging information.

It would be appreciated that the paging information transmitted to the UE 110 at 226 is not limited to the above-mentioned examples. In an example embodiment, at least a part of the configuration information discussed above may be included in the paging information. Thus, there may not be a need to separately transmit configuration information (in step 214) from the first cell 120*a* to the UE 110 as said configuration information may be included in the paging information (transmitted at 226). As discussed, all of the configuration information or part of it may be included in the paging information in some examples. Thus, in some example embodiments, one part of the configuration information may be transmitted at 214 and another part with the paging information at 226.

Based on receiving the paging information (e.g. upon receiving the paging information) or simply based on the received paging information, the UE 110 may synchronize with the second cell 120*b* at 228 and perform the paging-related action on the second cell 120*b* at 230. The UE 110 may acquire synchronization with the second cell 120*b* by using SSBs or reference signals received from the first cell 120*a* and the configuration information associated to the second cell 120*b*. For example, the first cell 120*a* may be used as a timing reference, and a relative timing advance may be used on top of the timing reference to acquire synchronization with the second cell 120*b*. The UE 110 may perform the synchronization operation after the time offset from receiving the paging information, i.e. when the second cell 120*b* has been active. As discussed above, the time offset may be indicated in the configuration information, the paging information, or preconfigured at the UE 110. After acquiring synchronization with the second cell 120*b*, the UE 110 may perform the paging-related action in the second cell 120*b* based on the paging information and optionally the configuration information. For example, the UE 110 may determine the paging-related action to be performed based on the paging information, or the paging-related action to be performed may be defined in the configuration information as discussed above. Some examples of the paging-related action will be discussed below, but the example embodiments are not necessarily limited to the examples.

In an example embodiment, in case (e.g. based on) the paging information (first paging information) comprises the WUS, the PEI, or the scheduling message (e.g. paging DCI) for scheduling a paging message, the paging-related action may comprise the second cell 120*b* transmitting and the UE 110 monitoring second paging information. I.e. for the UE, receiving the WUS, PEI, or said scheduling message from the first cell 120*a* may cause the UE 110 to monitor for second paging information from the second cell 120*b*. For example, the UE 110 may monitor for a WUS, a PEI, a scheduling message (e.g. paging DCI) for scheduling a paging message, or a paging message transmitted from the second cell 120*b*. Based on (e.g.in response to) the paging message from the second cell 120*b*, the UE 110 may further trigger a RA procedure or an RRC setup/resume procedure to establish/resume an RRC connection with the second cell 120*b*. In an example embodiment, if the configuration information or the first paging information indicates that the second cell 120*b* supports small data transmission (SDT) with the paging message, the UE 110 may decode additional small data transmitted in the paging message. For example, the small data may include information for initiating the RA procedure or the RRC setup/resume procedure.

In an example embodiment, in case (e.g. based on) the first paging information comprises the WUS or the paging message, the paging-related action may comprise at least one action for transferring information via the second cell 120*b*. Examples of the action for transferring information may include a transmission on a data channel in preconfigured resources, an action for a RA procedure (e.g. initiating the RA procedure towards the second cell 120*b*), an action for an RRC setup procedure, or an action for an RRC resume procedure. For example, the UE 110 may transmit, to the second cell 120*b*, a transmission on a data channel in preconfigured resources, a RA preamble, an RRC setup request, or an RRC resume request if the second cell 120*b* is the last serving cell of the UE 110 before the UE 110 goes into the RRC inactive state. The second cell 120*b* may receive, from the UE 110, the data channel transmission in preconfigured resources, the RA preamble, the RRC setup request, or the RRC resume request. In an example embodiment, the RA preamble message, the RRC setup request or the RRC resume request message may include mobile-originated small data transmission (MO-SDT). For example, the UE 110 may indicate in the MO-SDT that it is redirected from the first cell 120*a* to the second cell 120*b*.

In the above description, the UE 110 may either monitor the second paging information transmitted from the second cell 120*b* or perform the at least one action for transferring information via the second cell 120*b*, based on (e.g. in response to) the first paging information comprising the WUS. It may depend on the UE configuration, configuration implementation, or the configuration information or the first paging information may specify which action the UE 110 and the second cell 120*b* shall perform in response to the WUS.

At 232, the UE 110 and the second cell 120*b* may perform the RRC connection setup or resume procedure to establish an RRC connection between the UE 110 and the second cell 120*b*. In an example embodiment, the RRC connection setup or resume procedure may be performed in the operation 230 and the operation 232 may be omitted.

The first cell 120*a* may forward the DL data for the UE 110 received from the UPF to the second cell 120*b* at 234. It can be done earlier but after the second cell 120*b* is activated. When the RRC connection is established between the second cell 120*b* and the UE 110, the second cell 120*b* may transmit the DL data to the UE 110 at 236, and receive UL data transmissions from the UE 110 at 238.

In the above-discussed process 200, a solution for efficiently redirecting UEs to an SSB/SIB1-less cell is provided by dynamically controlling the paging-related actions of the Ues. It enables SSB/SIB1-less operations for RRC idle and inactive Ues, without compromising network energy saving gains. It would be appreciated that the principle of the process 200 may also be applied to enable the SSB/SIB1-less operations for one or more carriers within a single cell which operates multiple carriers, an example of which is shown in FIG. 3.

Figure 3:
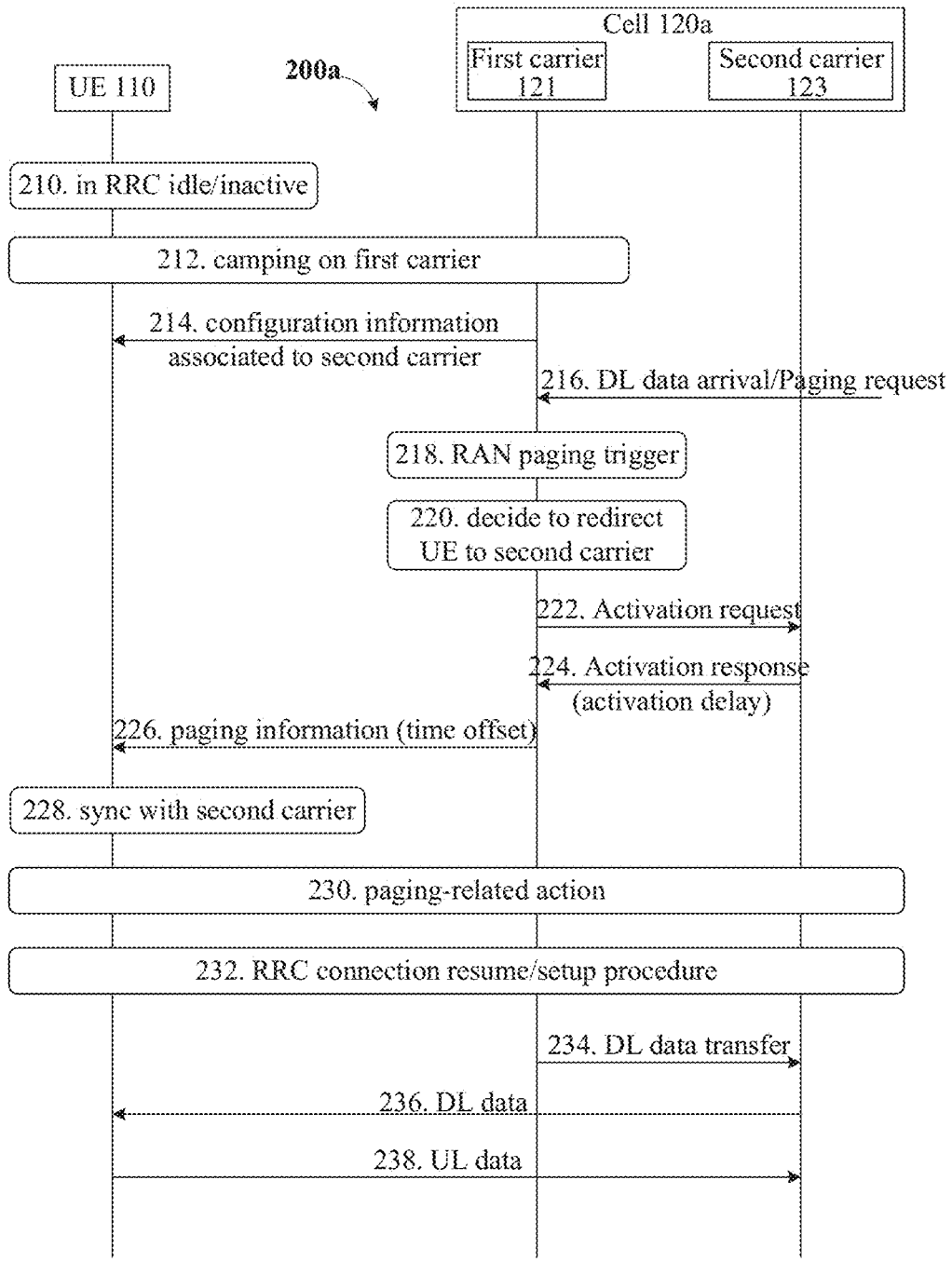
FIG. 3 is a message flow chart illustrating a process according to an example embodiment of the present disclosure.

FIG. 3 is a message flow chart illustrating a process 200*a* for the SSB/SIB1-less carrier operations according to an example embodiment of the present disclosure. The process 200*a* is similar to the process 200 discussed above with reference to FIG. 2, except that it is performed at the UE 110, a first carrier 121, and a second carrier 123. The first carrier 121 is a carrier that transmits SSBs and SIB1, and the second carrier 123 is a carrier that does not transmit SSBs and SIB1, i.e. a SSB/SIB1-less carrier. The first carrier 121 and the second carrier 123 may be operated in a single cell, e.g. the cell 120*a* supported by the base station 120. In general, operations performed at the first cell 120*a* in the process 200 may be performed at the first carrier 121 in the process 200*a*, and operations performed at the second cell 120*b* in the process 200 may be performed at the second carrier 123 in the process 200*a*. Other aspects of the process 200*a* may be identical or similar to the process 200, and a repetitive description is omitted here for convenience.

Figure 4:
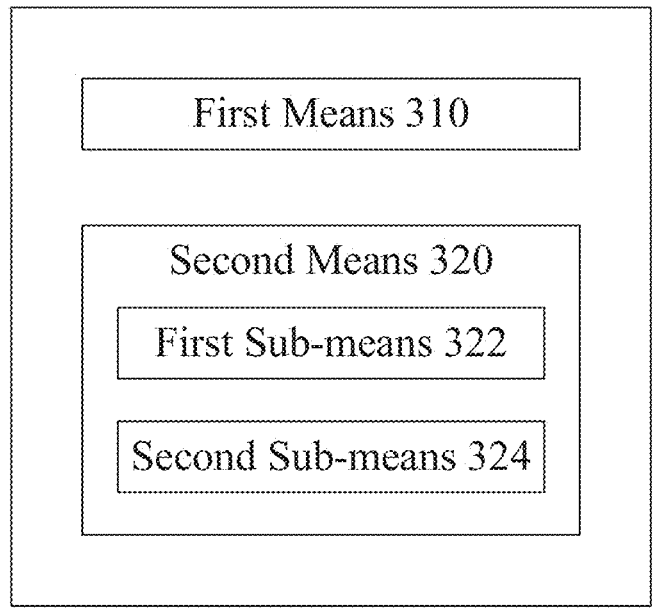
FIG. 4 is a schematic block diagram illustrating an apparatus according to an example embodiment of the present disclosure.

FIG. 4 is a schematic block diagram illustrating an apparatus 300 according to an example embodiment of the present disclosure. The apparatus 300 may be implemented to comprise or to form at least a part of a terminal device such as the UE 110 discussed above to perform at least a part of operations related to the UE 110. In an example embodiment, the apparatus 300 may include blocks implemented in software, hardware or a combination thereof to perform the operations. Since the operations related to the UE 110 have been discussed above with reference to FIGS. 1-3, the blocks of the apparatus 300 will be described briefly here and details thereof may refer to the above description.

Referring to FIG. 4, the apparatus 300 may include a first means 310 for receiving, via a first cell, first paging information related to a second cell or another carrier of the first cell, and a second means 320 for performing a paging-related action via the second cell or said another carrier based on the first paging information. The second cell or said another carrier may be configured such that synchronization signals are not transmitted via the second cell or said another carrier. The second means 320 may include a first sub-means 322 for monitoring for second paging information in the second cell or said another carrier in a case where the first paging information comprises a paging early indication, a wake-up signal, or a scheduling message for scheduling a paging message, and a second sub-means 324 for performing at least one action for transferring information via the second cell or said another carrier in a case where the first paging information comprises a paging message or a wake-up signal.

In an example embodiment, the apparatus 300 may further include a third means (not shown) for receiving, via the first cell, configuration information associated with the second cell or said another carrier of the first cell. The second means 320 may perform the paging related action further based on the configuration information.

In an example embodiment, the first cell may be a cell of a first radio access technology (RAT), and second cell may be a cell of a second RAT that is different than the first RAT. The first cell and the second cell may share a same carrier.

In an example embodiment, the first paging information may be received via a first carrier of the first cell, and said another carrier may be a second carrier of the first cell.

In an example embodiment, the second paging information may comprise at least one of a wake-up signal, a paging early indication, a scheduling message for scheduling a paging message, or a paging message.

In an example embodiment, the at least one action for transferring information may comprise an action for a random access procedure, a transmission on a data channel in preconfigured resources, an action for a radio resource control connection setup procedure, or an action for a radio resource control connection resume procedure.

In an example embodiment, the second cell or said another carrier of the first cell may be configured such that system information is not broadcasted via the second cell or said another carrier.

In an example embodiment, at least a part of the configuration information may be included in the first paging information, included in broadcasted system information that the apparatus 300 is caused to receive, or preconfigured at the apparatus 300.

In an example embodiment, the second means 320 may perform the paging-related action after a time offset from receiving the first paging information at the first means 310. The time offset may be indicated by the first paging information or by the configuration information, or preconfigured at the apparatus 300.

In an example embodiment, the apparatus 300 may further comprise a fourth means (not shown) for acquiring synchronization with the second cell or said another carrier based at least partially on the configuration information before the paging-related action.

In an example embodiment, the configuration information may comprise at least one of:

information indicating time and frequency resources configuration of the second cell or said another carrier;

information indicating a state of the second cell or said another carrier refraining from transmitting at least one of synchronization signal blocks and system information;

information indicating a reference signal of the first cell to be used for acquiring time and frequency synchronization with the second cell or said another carrier;

information of timing advance for the second cell or said another carrier;

information of a reference signal in the second cell or said another carrier collocated with occasions for the paging-related action;

information indicating which apparatuses shall perform the paging-related action on the second cell or said another carrier;

information indicating whether the paging-related action comprises monitoring a wake-up signal, a paging early indication, a scheduling message for scheduling a paging message, or a paging message, or performing a random access procedure, a transmission on a data channel in preconfigured resources, a radio resource control connection setup procedure, or a radio resource control connection resume procedure;

information of time and frequency resources for performing the paging-related action via the second cell or said another carrier;

information of a cell identity of the second cell or carrier frequency of said another carrier;

information indicating whether a mobile terminated small data transmission is allowed in the second cell or said another carrier;

information of random access resources related to the second cell or said another carrier; or information of paging configuration associated to the second cell or said another carrier.

In an example embodiment, the apparatus 300 may operate in an idle or inactive state in a non-carrier aggregation mode. The first cell and the second cell may be collocated with each other.

According to an example embodiment, the first paging information may indicate whether the UE 110 shall perform the paging-related action with the first cell 120a or with the second cell 120a. For example, the first paging information may comprise an indicator element (e.g. one bit indicator) for indicating whether the paging-related action shall be performed with the first cell 120 or with the second cell 120b. Thus, for example, the first paging information may indicate whether the UE 110 shall monitor the second paging information from the first cell 120a or from the second cell 120b. For example, the PEI or scheduling message may comprise an indicator to indicate which of the cells 120a, 120b to monitor for paging messages. In another example, the paging message may indicate whether to perform action for transmitting data with the first cell 120a or with the second cell 120b. For example, the paging message may include an indicator indicating first cell 120a or second cell 120b. For example, based on the indicator indicating the second cell 120b, the UE 110 may perform action for transmitting data with the second cell 120b (e.g. transmit RA preamble via the second cell 120b).

Figure 5:
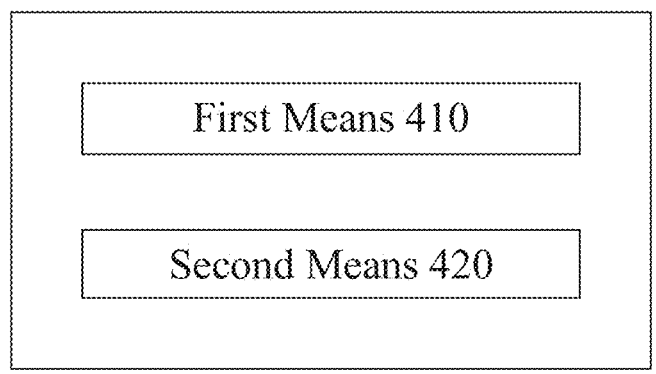
FIG. 5 is a schematic block diagram illustrating an apparatus according to an example embodiment of the present disclosure.

FIG. 5 is a schematic block diagram illustrating an apparatus 400 according to an example embodiment of the present disclosure. The apparatus 400 may be implemented to comprise or to form at least a part of a network device such as the base station 120 discussed above to perform at least a part of operations related to the base station 120. The apparatus 400 may include blocks implemented in software, hardware or a combination thereof to perform the operations. Since the operations related to the base station 120 have been discussed above with reference to FIGS. 1-3, the blocks of the apparatus 400 will be described briefly here and details thereof may refer to the above description.

Referring to FIG. 5, the apparatus 400 may include a first means 410 for determining to page a terminal device camping on a first cell, and a second means 420 for transmitting, via the first cell, first paging information redirecting the terminal device to a second cell or another carrier of the first cell. The second cell or said another carrier may be configured such that synchronization signals are not transmitted via the second cell or said another carrier.

In an example embodiment, the apparatus 400 may further include a third means (not shown) for performing a paging-related action via the second cell or said another carrier based on the first paging information. In an example, the third means may include a first sub-means (not shown) for transmitting second paging information via the second cell or said another carrier to the terminal device in a case where the first paging information comprises a paging early indication, a wake-up signal, or a scheduling message for scheduling a paging message, and a second sub-means (not shown) for performing at least one action for receiving information via the second cell or said another carrier from the terminal device in a case where the first paging information comprises a paging message or a wake-up signal. The first cell and the second cell may be supported by the apparatus 400.

In an example embodiment, the apparatus 400 may further include a fourth means (not shown) for transmitting, via the first cell, configuration information associated with the second cell or said another carrier of the first cell. The third means may perform the paging related action further based on the configuration information.

In an example embodiment, the first cell may be a cell of a first radio access technology (RAT), and the second cell may be a cell of a second RAT that is different than the first RAT. The first cell and the second cell may share a same carrier.

In an example embodiment, the first paging information may be transmitted via a first carrier of the first cell, and said another carrier may be a second carrier of the first cell.

In an example embodiment, the second paging information may comprise at least one of a wake-up signal, a paging early indication, a scheduling message for scheduling a paging message, or a paging message.

In an example embodiment, the at least one action for receiving information may comprise an action for a random access procedure, an action for receiving a transmission on a data channel in preconfigured resources, an action for a radio resource control connection setup procedure, or an action for a radio resource control connection resume procedure.

In an example embodiment, the second cell or said another carrier of the first cell may be configured such that system information is not broadcasted via the second cell or said another carrier.

In an example embodiment, at least a part of the configuration information may be included in the first paging information or included in broadcasted system information.

In an example embodiment, the third means may perform the paging-related action after a time offset from transmitting the first paging information at the second means 420. The time offset may be indicated to the terminal device by the first paging information or by the configuration information.

In an example embodiment, the apparatus 400 may further include a fifth means (not shown) for deciding to redirect the terminal device to the second cell or said another carrier, before the second means 420 transmits the first paging information, based on at least one of:

a type of downlink traffic for which the terminal device is to be paged;

a current load of the first cell or a first carrier of the first cell the terminal device camping on; or a transition time for the second cell or said another carrier to transition from a sleeping state to an active state.

In an example embodiment, the terminal device may operate in an idle or inactive state in a non-carrier aggregation mode. The first cell and the second cell may be collocated with each other.

Figure 6:
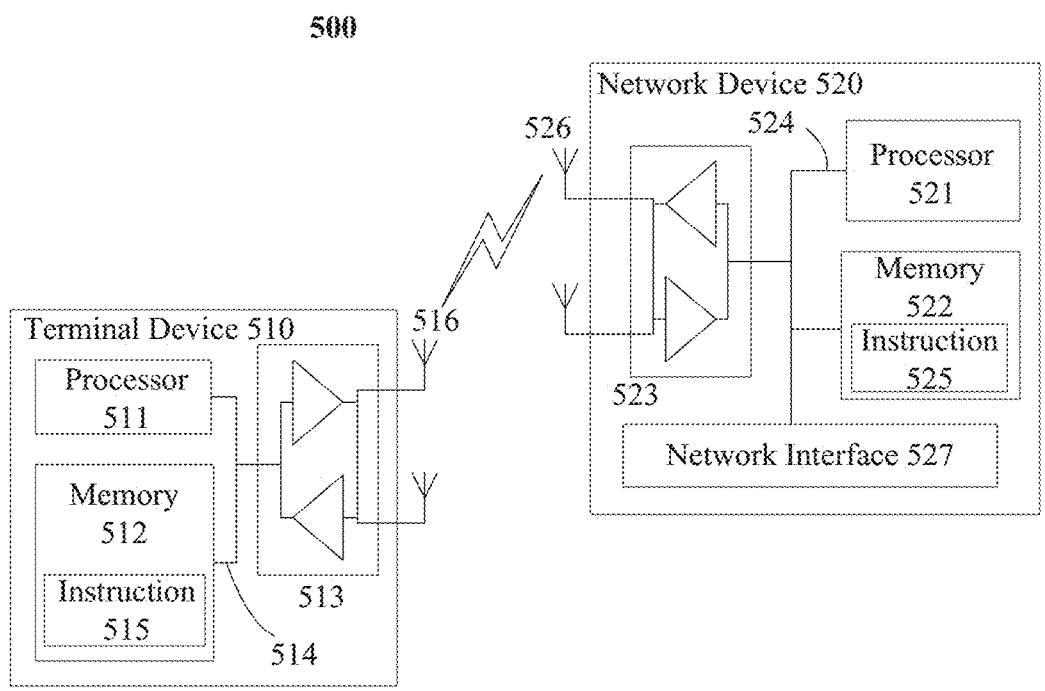
FIG. 6 is a schematic block diagram illustrating devices in a communication system according to an example embodiment of the present disclosure.

FIG. 6 is a schematic block diagram illustrating devices in a communication system 500 according to an example embodiment of the present disclosure. As shown in FIG. 6, the communication system 500 may comprise a terminal device 510 and a network device 520. The terminal device 510 may be implemented as the UE 110 discussed above, and the network device 120 may be implemented as the base station 120 discussed above.

Referring to FIG. 6, the terminal device 510 may comprise one or more processors 511, one or more memories 512 and one or more transceivers 513 interconnected through one or more buses 514. The one or more buses 514 may be address, data, or control buses, and may include any interconnection mechanism such as series of lines on a motherboard or integrated circuit, fiber, optics or other optical communication equipment, and the like. Each of the one or more transceivers 513 may comprise a receiver and a transmitter, which are connected to one or more antennas 516. The terminal device 510 may wirelessly communicate with the radio access network device 520 through the one or more antennas 516. The one or more memories 512 may include instructions 515 which, when executed by the one or more processors 511, may cause the terminal device 510 to perform operations and procedures relating to the UE 110 as described above.

The network device 520 may comprise one or more processors 521, one or more memories 522, one or more transceivers 523 and one or more network interfaces 527 interconnected through one or more buses 524. The one or more buses 524 may be address, data, or control buses, and may include any interconnection mechanism such as a series of lines on a motherboard or integrated circuit, fiber, optics or other optical communication equipment, and the like. Each of the one or more transceivers 523 may comprise a receiver and a transmitter, which are connected to one or more antennas 526. The network device 520 may operate as a base station for the terminal device 510 and wirelessly communicate with terminal device 510 through the one or more antennas 526. The one or more network interfaces 527 may provide wired or wireless communication links through which the network device 520 may communicate with other network devices, entities, elements or functions. For example, the network device 520 may communicate with a core network device (not shown) via backhaul connections. The one or more memories 522 may include instructions 525 which, when executed by the one or more processors 521, may cause the network device 520 to perform operations and procedures relating to the base station 120.

The one or more processors 511, 521 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 511, 521 may be configured to control other elements of the terminal/network device and operate in cooperation with them to implement the procedures discussed above.

The one or more memories 512, 522 may include at least one storage medium in various forms, such as a transitory memory and/or a non-transitory memory. The transitory memory may include, but not limited to, for example, a random access memory (RAM) or a cache. The non-transitory memory may include, but not limited to, for example, a read only memory (ROM), a hard disk, a flash memory, and the like. The term "non-transitory," as used herein, is a limitation of the medium itself (i.e., tangible, not a signal) as opposed to a limitation on data storage persistency (e.g., RAM vs. ROM). Further, the one or more memories 512, 522 may include but not limited to an electric, a magnetic, an optical, an electromagnetic, an infrared, or a semiconductor system, apparatus, or device or any combination of the above.

Some exemplary embodiments further provide instruction or instructions (e.g. computer code or computer instructions) which, when executed by one or more processors, may cause a device or apparatus to perform the procedures described above. The program instruction for carrying out procedures of the exemplary embodiments may be written in any combination of one or more programming languages. The program instruction may be provided to one or more processors or controllers of a general purpose computer, special purpose computer, or other programmable data processing apparatus, such that the program instruction, when executed by the processor or controller, cause the functions/operations specified in the flowcharts and/or block diagrams to be implemented. The program instruction may execute entirely on a machine, partly on the machine, as a stand-alone software package, partly on the machine and partly on a remote machine or entirely on the remote machine or server.

Some exemplary embodiments further provide a computer program product or a computer readable medium having the program instruction or instructions stored therein. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The means of the apparatus or UE may be implemented in hardware and/or software. They may comprise for instance at least one processor for executing processor instructions for performing the required functions, at least one memory storing the instructions, or both. Alternatively, they could comprise for instance circuitry that is designed or configured to implement the required functions, for instance implemented in a chipset or a chip, like an integrated circuit. In general, the means may comprise for instance one or more processing means or processors.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

It would be understood that blocks in the drawings may be implemented in various manners, including software, hardware, firmware, or any combination thereof. In some embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

The invention claimed is:

1. A terminal device comprising:
   at least one processor; and
   at least one memory storing instructions that, when executed by the at least one processor, cause the terminal device at least to perform:
      receiving, via a first cell, first paging information related to a second cell or another carrier of the first cell, wherein the second cell or said another carrier is configured such that synchronization signals are not transmitted via the second cell or said another carrier;
      performing a paging-related action via the second cell or said another carrier based on the first paging information, wherein the paging-related action comprises:

monitoring for second paging information in the second cell or said another carrier, in a case where the first paging information comprises a paging early indication, a wake-up signal, and a scheduling message for scheduling a paging message, and performing at least one action for transferring information via the second cell or said another carrier, in a case where the first paging information comprises a paging message or a wake-up signal; and receiving, via the first cell, configuration information associated with the second cell or said another carrier of the first cell, wherein the paging related action is performed further based on the configuration information, wherein the second paging information comprises a wake-up signal, a paging early indication, a scheduling message for scheduling a paging message, and a paging message, wherein the first cell is a cell of a first radio access technology, RAT, and the second cell is a cell of a second RAT that is different than the first RAT, and the first cell and the second cell share a same carrier, wherein the first paging information is received via a first carrier of the first cell, and said another carrier is a second carrier of the first cell, and wherein the configuration information includes:

information indicating time and frequency resources configuration of the second cell or said another carrier;

information indicating a state of the second cell or said another carrier refraining from transmitting at least one of synchronization signal blocks and system information;

information indicating a reference signal of the first cell to be used for acquiring time and frequency synchronization with the second cell or said another carrier;

information of timing advance for the second cell or said another carrier;

information of a reference signal in the second cell or said another carrier collocated with occasions for the paging-related action;

information indicating which terminal devices shall perform the paging-related action on the second cell or said another carrier;

information indicating whether the paging-related action comprises monitoring a wake-up signal, a paging early indication, a scheduling message for scheduling a paging message, or a paging message, or performing a random access procedure, a transmission on a data channel in preconfigured resources, a radio resource control connection setup procedure, or a radio resource control connection resume procedure;

information of time and frequency resources for performing the paging-related action via the second cell or said another carrier;

information of a cell identity of the second cell or carrier frequency of said another carrier;

information indicating whether a mobile terminated small data transmission is allowed in the second cell or said another carrier;

information of random access resources related to the second cell or said another carrier; and information of paging configuration associated to the second cell or said another carrier.

* * * * *